United States Patent
Shimizu

(10) Patent No.: US 10,764,461 B2
(45) Date of Patent: Sep. 1, 2020

(54) IMAGE READING APPARATUS WITH DETERMINATION OF ORIGINAL SIZE, AND IMAGE FORMING APPARATUS, READING METHOD, AND IMAGE FORMING SYSTEM THEREWITH

(71) Applicant: CANON KABUSHIKI KAISHA, Tokyo (JP)

(72) Inventor: Hiromu Shimizu, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/839,564

(22) Filed: Dec. 12, 2017

(65) Prior Publication Data

US 2018/0176407 A1   Jun. 21, 2018

(30) Foreign Application Priority Data

Dec. 16, 2016   (JP) .................. 2016-244057

(51) Int. Cl.
 *H04N 1/407*   (2006.01)
 *H04N 1/04*   (2006.01)
 (Continued)

(52) U.S. Cl.
 CPC ....... *H04N 1/0461* (2013.01); *H04N 1/00681* (2013.01); *H04N 1/00687* (2013.01); *H04N 1/00702* (2013.01); *H04N 1/00708* (2013.01); *H04N 1/00748* (2013.01); *H04N 1/00771* (2013.01); *H04N 1/107* (2013.01); *H04N 1/32245* (2013.01)

(58) Field of Classification Search
 None
 See application file for complete search history.

(56) References Cited

U.S. PATENT DOCUMENTS 7,924,480 B2 *   4/2011   Iwaki .................. H04N 1/00681
 358/449
8,330,997 B2 *   12/2012   Quan .................. H04N 1/00681
 358/474

(Continued)

FOREIGN PATENT DOCUMENTS

| JP | 2001-036696 | 2/2001 |
| JP | 2009-164808 | 7/2009 |
| JP | 2009-171217 | 7/2009 |

OTHER PUBLICATIONS

U.S. Appl. No. 15/839,558, filed Dec. 12, 2017.
U.S. Appl. No. 15/839,568, filed Dec. 12, 2017.

*Primary Examiner* — Dung D Tran
(74) *Attorney, Agent, or Firm* — Venable LLP

(57) ABSTRACT

An image reading apparatus compares a difference in luminance value between a pixel of interest in image information acquired via a reading unit and a pixel separated from the pixel of interest by a first distance with a first threshold value. Further, the image reading apparatus compares a difference in luminance value between the pixel of interest and a pixel present within a range to a pixel separated from the pixel of interest by a second distance that is larger than the first distance with a second threshold value. The image reading apparatus determines whether or not the pixel of interest is an edge pixel at an original end portion based on results of those comparisons, and determines an original size based on a result of the determination.

12 Claims, 12 Drawing Sheets

(51) Int. Cl.
  *H04N 1/00*  (2006.01)
  *H04N 1/107*  (2006.01)
  *H04N 1/32*  (2006.01)

(56) References Cited

U.S. PATENT DOCUMENTS

| | | | |
|---:|---|---|---|
| 8,619,314 B2 * | 12/2013 | Bannai | H04N 1/0071 |
| | | | 358/1.12 |
| 8,908,235 B2 * | 12/2014 | Maeda | H04N 1/00681 |
| | | | 358/449 |
| 9,305,236 B2 * | 4/2016 | Shimazaki | H04N 1/48 |
| 10,230,867 B2 * | 3/2019 | Wada | H04N 1/3224 |
| 10,356,269 B2 * | 7/2019 | Shimizu | H04N 1/6088 |
| 2002/0041406 A1 * | 4/2002 | Takahashi | H04N 1/38 |
| | | | 358/519 |
| 2010/0149603 A1 * | 6/2010 | Maeda | H04N 1/00681 |
| | | | 358/449 |
| 2013/0063788 A1 * | 3/2013 | Iwayama | G06K 9/00442 |
| | | | 358/448 |
| 2017/0150008 A1 * | 5/2017 | Haruta | H04N 1/52 |
| 2017/0163838 A1 * | 6/2017 | Obata | H04N 1/00748 |
| 2018/0176400 A1 * | 6/2018 | Shimizu | H04N 1/00708 |
| 2018/0176401 A1 * | 6/2018 | Shimizu | H04N 1/00708 |
| 2018/0288237 A1 * | 10/2018 | Akagi | H04N 1/0071 |
| 2018/0309895 A1 * | 10/2018 | Shimizu | H04N 1/00997 |

\* cited by examiner

IMAGE READING APPARATUS WITH DETERMINATION OF ORIGINAL SIZE, AND IMAGE FORMING APPARATUS, READING METHOD, AND IMAGE FORMING SYSTEM THEREWITH

BACKGROUND OF THE INVENTION

Field of the Invention

The present invention relates to an image reading apparatus, an image forming apparatus, a reading method for an image reading apparatus and an image forming system.

Description of the Related Art

There has been known an image reading apparatus configured to read image information in a main scanning direction of an original placed on an original table glass while a reading unit is conveyed in a sub-scanning direction. The image reading apparatus detects a size of the original based on the read image information, for example. Specifically, the image reading apparatus detects an original edge (original end) based on the image information to determine the original size based on a result of the detection.

However, in the detection method as described above, when dust, hair, or other dirt adheres to, for example, the original table glass or an original pressing member mounted to a back surface side (original table glass opposing surface side) of a platen (platen cover), false detection of the original edge may occur.

In order to address such a problem, an image reading apparatus disclosed in Japanese Patent Application Laid-open No. 2001-036696 determines whether the read image information is from an original region candidate pixel or an original region outside candidate pixel, to thereby detect the original edge based on the number of repetitions of each candidate pixel. The image reading apparatus is based on a premise that the original pressing member, which is normally white, has a black color, or a light source is turned on under a state in which the platen is opened. This is because, with this premise, a luminance of a region outside the original region is decreased, and thus the determination between the original region candidate pixel and the original region outside candidate pixel is facilitated. In this method, however, it is required to change the configuration of the original pressing member, which is normally white, so that the region outside the original region is prevented from being blackened. Further, the light source is turned on under a state in which the platen is opened, and hence there still remains a problem in that the user feels dazzled.

An image analysis apparatus disclosed in Japanese Patent Application Laid-open No. 2009-171217 uses a known differential filter to convert image data of an original into edge image data, and detects continuity of an edge point in the edge image data, to thereby avoid the influence of the dirt. This image analysis apparatus still has a problem in that false detection may occur when a white streak caused when a shading white plate gets dirty appears in an image at a position on the outer side of the original edge in the main scanning direction. This false detection occurs because the white streak appears in the image as a straight line, and continuity is determined to be present.

The present invention has a primary object to provide an image reading apparatus capable of preventing a user from feeling dazzled, and also capable of detecting a size of an original with high accuracy.

SUMMARY OF THE INVENTION

An image reading apparatus according to the present disclosure includes: an original table on which an original is to be placed; an original presser configured to press the original placed on the original table; an illumination unit configured to irradiate the original with light; a reading unit configured to read light reflected from the original that is irradiated with light by the illumination unit to output image information; and a controller configured to cause the illumination unit to illuminate the original based on whether the original presser is in an open state or a closed state, and to determine a size of the original based on the image information output from the reading unit, wherein the controller is configured to determine, based on a first difference between the image information of a pixel of interest and image information of a pixel separated from the pixel of interest by a first distance and on a second difference between the image information of the pixel of interest and image information of a pixel present within a range to a pixel separated from the pixel of interest by a second distance that is larger than the first distance, whether the pixel of interest is an edge pixel at an original end portion; and determine the size of the original based on a result of the determination.

Further features of the present invention will become apparent from the following description of exemplary embodiments (with reference to the attached drawings).

DESCRIPTION OF THE EMBODIMENTS

Now, a description is given by means of an example of a case in which the present invention is applied to an image forming system. The technical scope of the present invention is defined by the scope of claims, and is not limited by individual embodiments described below.

First Embodiment

Figure 1:
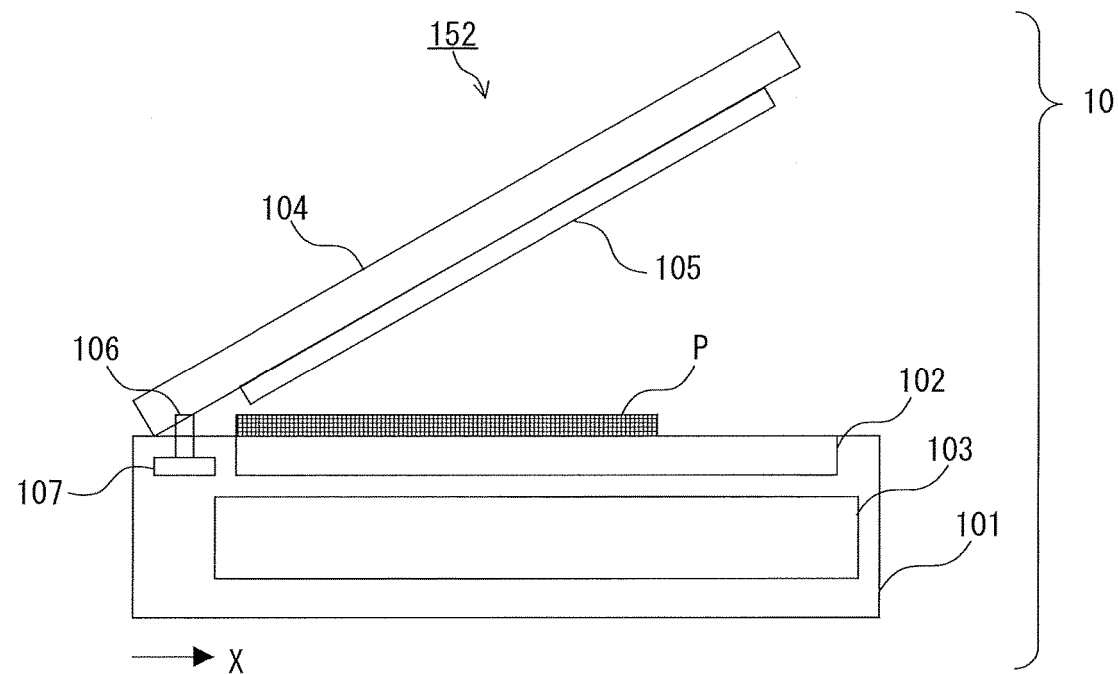
FIG. 1 is a schematic vertical sectional view for illustrating an example of a configuration of an image forming system according to a first embodiment of the present invention.
Figure 1:
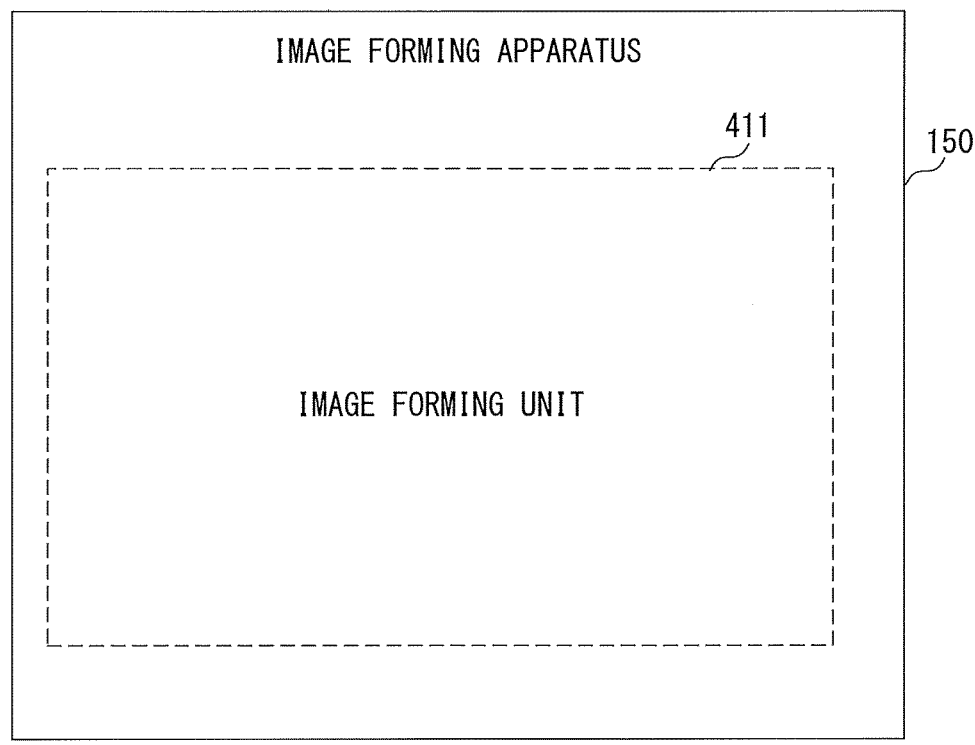

FIG. 1 is a schematic vertical sectional view for illustrating an example of a configuration of an image forming system according to a first embodiment of the present invention. An image forming system 152 includes an image reading apparatus 10 and an image forming apparatus 150. An arrow X of FIG. 1 represents a main scanning direction (direction in which an original edge is detected).

The image forming apparatus 150 includes an image forming unit 411 configured to form an image by a known electrophotographic printing method. The image forming unit 411 includes a photosensitive member, an exposure device, a developing device, a transfer unit, and a fixing device. The exposure device is configured to form an electrostatic latent image on the photosensitive member based on read data (image data) generated by the image reading apparatus 10 reading an original P. The developing device is configured to form a developer image on the photosensitive member by developing the electrostatic latent image formed on the photosensitive member by a developer. The transfer unit is configured to transfer the developer image formed on the photosensitive member onto a given recording medium (for example, a sheet of paper). The fixing device is configured to fix the developer image transferred onto the recording medium to the recording medium. With the above-mentioned configuration, the image forming unit 411 forms an image corresponding to the image data on the recording medium.

The image reading apparatus 10 includes a casing 101, an original table glass 102 serving as an original table on which an original is placed when an image on the original is read, a reading unit 103, a platen (platen cover) 104, an original pressing member 105, a platen open/close detection flag 106, and a platen open/close detection sensor 107. The original pressing member 105 is mounted on a back surface side (surface side opposing the original table glass 102) of the platen 104.

The original table glass 102 is an original table on which the original P is placed. The reading unit 103 reads the original P placed on the original table (on the original table glass 102).

The platen 104 presses the original P placed on the original table glass 102 against the original table glass 102 via the original pressing member 105. The platen 104 is configured such that an angle of the platen 104 with respect to the original table glass 102 is changeable in order to enable the original P to be placed on the original table glass 102 or enable the original P to be removed from the top of the original table glass 102. The original pressing member 105 has a white surface so that a region outside an original region is prevented from being blackened when the original P is read. As described above, the platen 104 and the original pressing member 105 function as an original presser configured to press the original P against the original table glass 102.

The platen open/close detection sensor 107 is configured to switch its ON/OFF state when the platen open/close detection flag 106 moves depending on whether the platen 104 is in an open state or a closed state. Depending on the state of the platen open/close detection sensor 107, whether or not the original P placed on the original table glass 102 is in a state of being pressed against the original table glass 102 by the original pressing member 105 (whether or not the platen 104 is in the closed state) can be detected.

Figure 2:
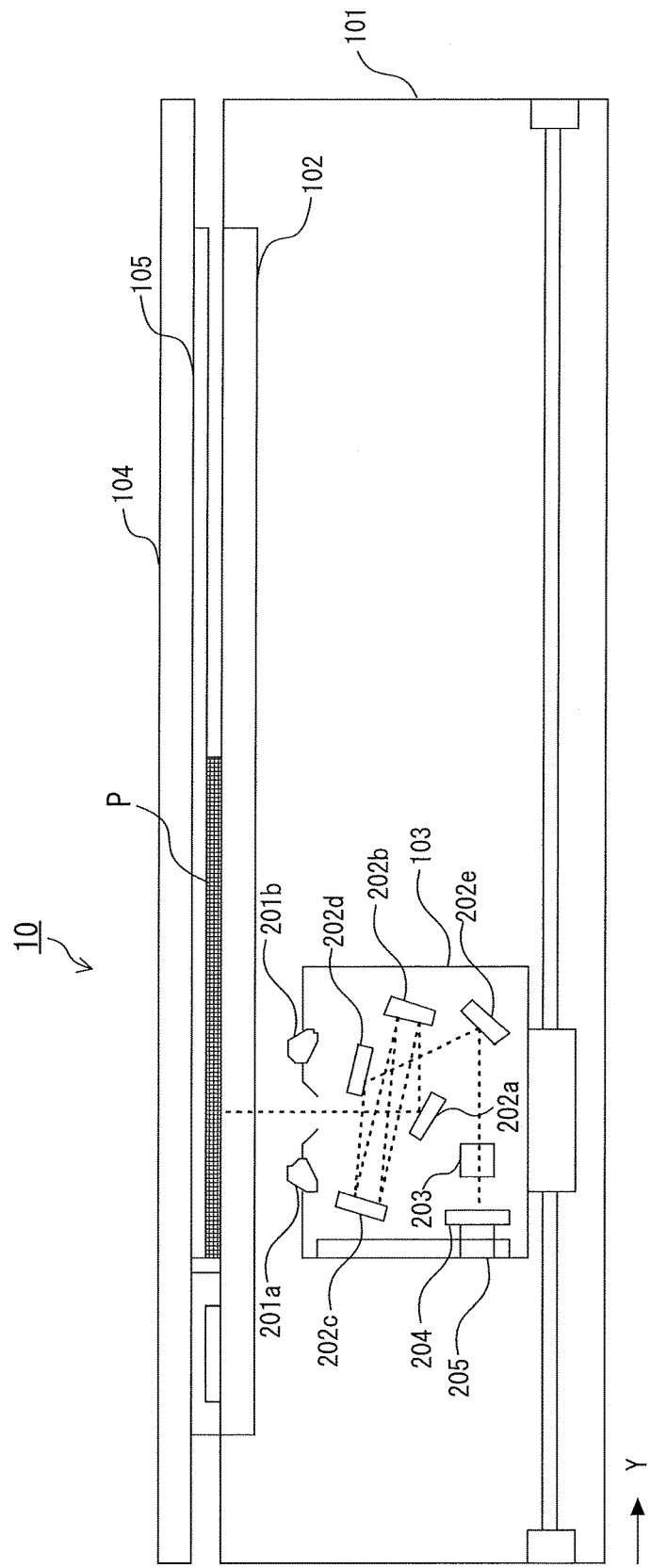
FIG. 2 is a schematic vertical sectional view for illustrating an example of a configuration of an image reading apparatus.

FIG. 2 is a schematic vertical sectional view for illustrating an example of the configuration of the image reading apparatus 10. The reading unit 103 includes illumination units 201a and 201b configured to irradiate a surface of the original placed on the original table with light, reflective mirrors 202a, 202b, 202c, 202d, and 202e configured to reflect the light reflected from the original surface, and an imaging lens 203. The reading unit 103 further includes a photoelectric conversion element 204 formed of, for example, a charge coupled device (CCD), and a sensor board 205 having the photoelectric conversion element 204 mounted thereon.

When the original P is read, the reading unit 103 is moved in an arrow Y direction of FIG. 2 (direction orthogonal to the main scanning direction, that is, sub-scanning direction) to read the original P. The arrow Y direction is a direction orthogonal to an arrow X direction of FIG. 1.

Figure 3:
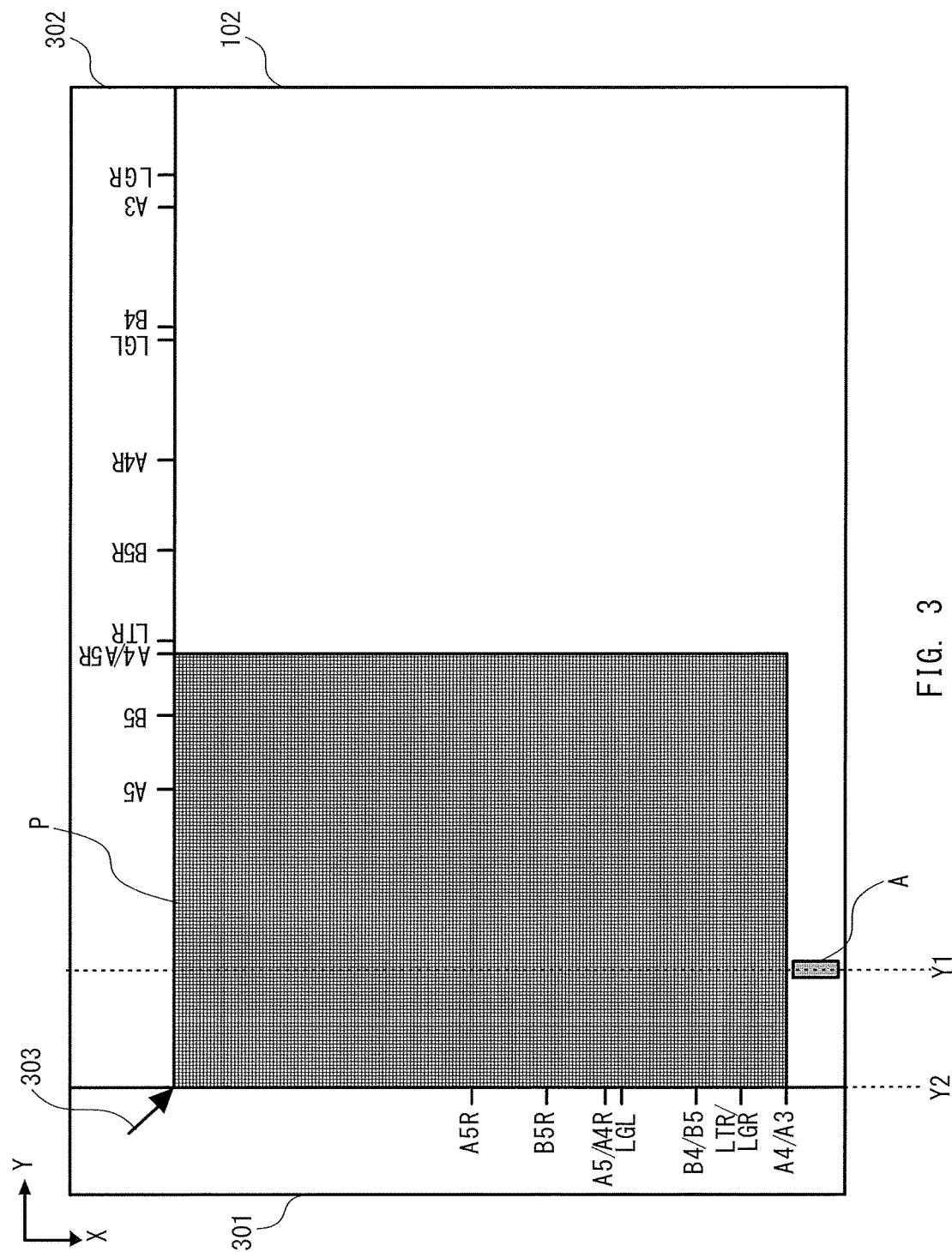
FIG. 3 is a schematic view for illustrating the image reading apparatus as viewed from the top under a state in which a platen is opened.

FIG. 3 is a schematic view for illustrating the image reading apparatus 10 as viewed from the top under a state in which the platen 104 is opened. In a region 301 of FIG. 3, a main scanning original size index (hereinafter referred to as "main scanning original size index 301") is marked. In a region 302, a sub-scanning original size index (hereinafter referred to as "sub-scanning original size index 302") is marked. Further, a reference position 303 indicated by an arrow in FIG. 3 is a reference position used when the original P is placed on the original table glass 102.

The original P to be read is placed on the original table glass 102 so that an upper left corner of the original P matches the reference position 303. FIG. 3 is an illustration of a state in which the A4-size original P is placed on the original table glass 102.

A position Y1 of FIG. 3 is an original size detection position, which is set to a position separated from an original reading start position Y2 by a predetermined amount. A region A of FIG. 3 represents a region outside a maximum standard size. The maximum standard size is smaller than the maximum size that can be read by the image reading apparatus 10 in the main scanning direction.

Now, a reading operation to be performed by the image reading apparatus 10 is described.

The image reading apparatus 10 moves the reading unit 103 to the original size detection position Y1 when the platen open/close detection sensor 107 detects that the platen 104 is opened, that is, detects the change from the closed state to the open state.

When the platen open/close detection sensor 107 detects that the platen 104 is closed, that is, detects the change from the open state to the closed state, the image reading apparatus 10 turns on the illumination units 201a and 201b. Then, the image reading apparatus 10 moves the reading unit 103 from the original size detection position Y1 to the original reading start position Y2.

At this time, the image reading apparatus 10 causes the reading unit 103 to read image information of the original P for one line or a plurality of lines in the main scanning direction. A length in the main scanning direction that can be read by the reading unit 103 (readable main scanning length) is, for example, from the reference position 303 to an outermost edge (right end in FIG. 3) of the maximum standard size outside region A.

The image reading apparatus 10 detects an original edge (original end portion), that is, an original edge position in the main scanning direction based on the read image information. Further, the image reading apparatus 10 performs protruding original determination (determination on whether or not an original P having a size that protrudes from the original table glass 102 is placed) based on the image information of the maximum standard size outside region A. The illumination units 201a and 201b are turned on after the platen 104 is closed, and hence the light does not reach the user's eyes.

Figure 4:
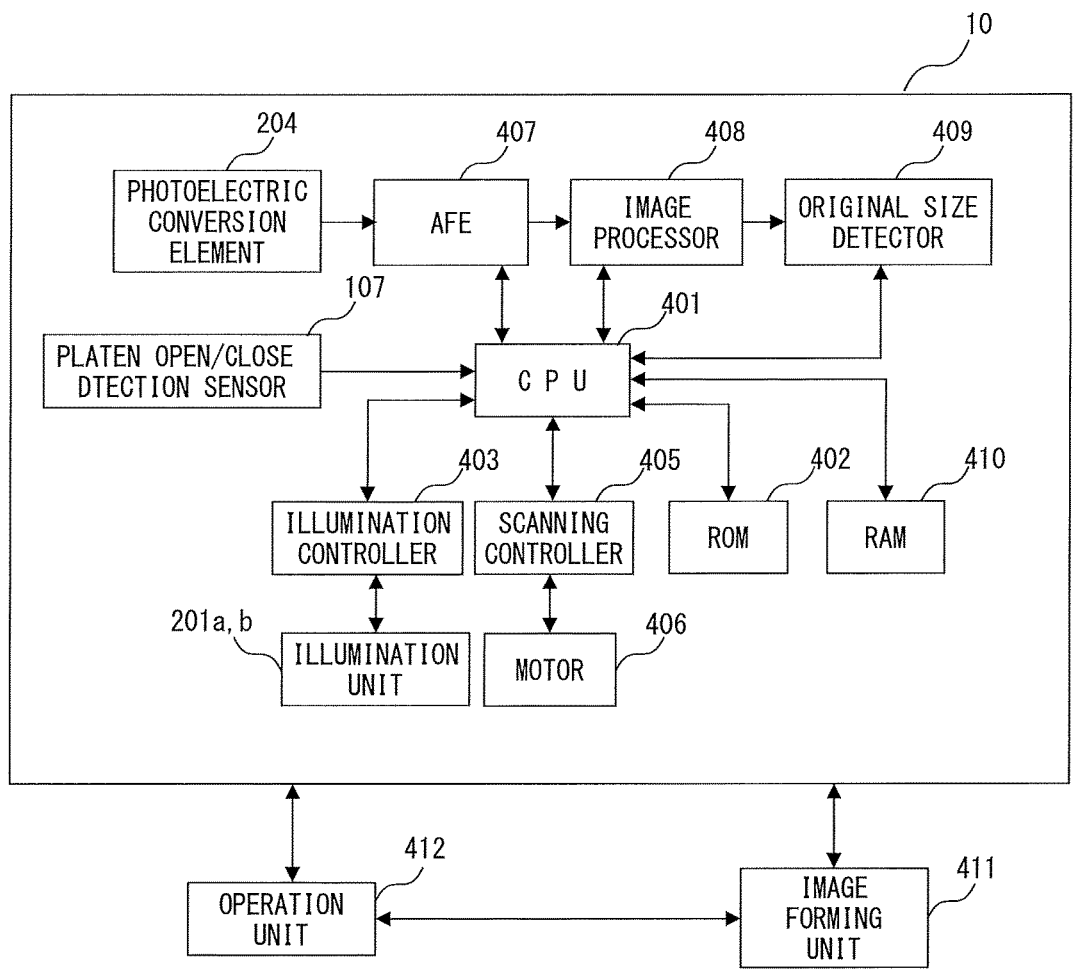
FIG. 4 is a block diagram for illustrating a functional configuration of the image forming system.

FIG. 4 is a block diagram for illustrating the functional configuration of the image forming system 152. The image reading apparatus 10 includes a central processing unit (CPU) 401, a read only memory (ROM) 402, an illumination controller 403, a scanning controller 405, a motor 406, an analog front end (AFE) 407, and an image processor 408. The image reading apparatus 10 further includes an original size detector 409 and a random access memory (RAM) 410.

The CPU 401 executes a program stored in the ROM 402 to control each functional unit of the image reading apparatus 10. The RAM 410 is used to temporarily or permanently store data to be used by the CPU 401.

The illumination controller 403 controls the operation of turning on or off the illumination units 201a and 201b.

The scanning controller 405 transmits a drive signal to the motor 406 to move the reading unit 103 in the sub-scanning direction.

The photoelectric conversion element 204 converts the received image information into an electrical signal.

The AFE 407 subjects the analog signal acquired from the photoelectric conversion element 204 to sample-hold processing, offset processing, gain processing, or other analog processing. The AFE 407 performs A/D conversion of converting the signal subjected to the analog processing into a digital signal, and outputs the processed signal to the image processor 408.

The image processor 408 subjects the image information acquired from the AFE 407 to predetermined digital image processing, and outputs the result to the original size detector 409 and the CPU 401.

The original size detector 409 detects the original edge based on the image information output from the image processor 408, and determines the original size based on the original edge position. After performing predetermined processing, the image reading apparatus 10 starts the original size detection, which is triggered by detection of the closed state of the platen 104 by the platen open/close detection sensor 107.

The image forming unit 411 forms an image on a recording medium based on the image information received from the image processor 408.

An operation unit 412 is an input/output device including, for example, a monitor for information display and various operation keys including a start button for issuing an instruction of the start of reading. The operation unit 412 displays information to the user and receives an instruction from the user.

Figure 5:
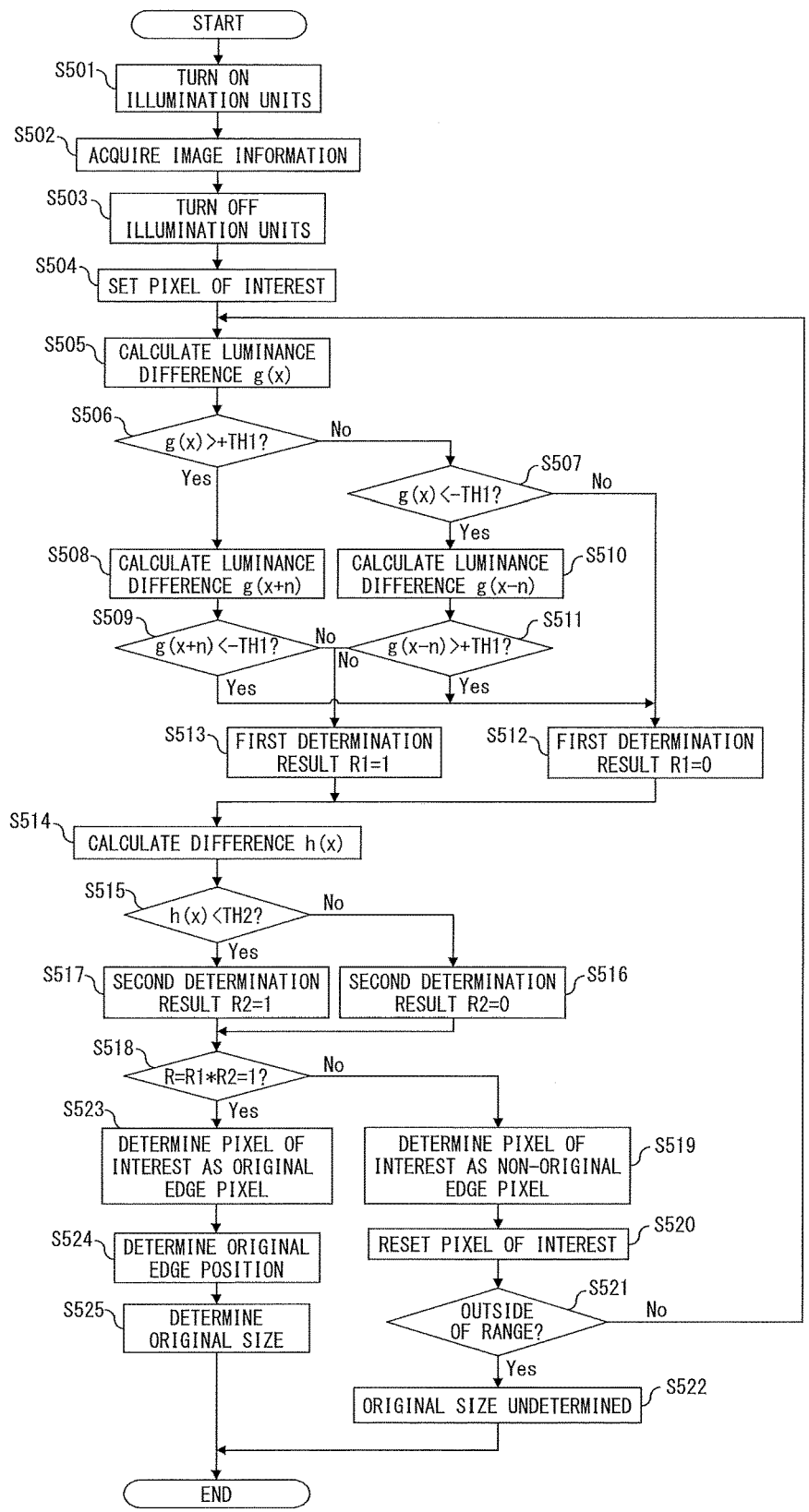
FIG. 5 is a flow chart for illustrating an example of a processing procedure of original size detection processing to be performed by the image reading apparatus.

FIG. 5 is a flow chart for illustrating an example of a processing procedure of original size detection processing to be performed by the image reading apparatus 10. Each step of processing illustrated in FIG. 5 is mainly executed by the CPU 401.

When the platen open/close detection sensor 107 detects that the platen 104 is opened, that is, detects the change from the closed state to the open state, the CPU 401 moves the reading unit 103 to the original size detection position Y1. When the platen open/close detection sensor 107 detects that the platen 104 is closed, that is, detects the change from the open state to the closed state, the CPU 401 turns on the illumination units 201a and 201b (Step S501). The CPU 401 acquires the image information of the original for one line in the main scanning direction (Step S502). The CPU 401 turns off the illumination units 201a and 201b (Step S503).

The CPU 401 sets, as a pixel of interest, a pixel on the outermost side in an original edge detection range in the main scanning direction based on the acquired image information (Step S504). The outermost pixel is a pixel at a position that is most separated from the reference position 303 in the main scanning direction. The original edge detection range in the main scanning direction is a predetermined range from a position on the inner side of the minimum standard size by a predetermined amount to a position on the outer side of the maximum standard size by a predetermined amount. In the description of the first embodiment, the reference position 303 side of original abutment in the main scanning original size index 301 illustrated in FIG. 3 corresponds to the inner side in the main scanning direction, and the side on which the maximum standard size (A4/A3) is indicated corresponds to the outer side in the main scanning direction.

The CPU 401 sets a main scanning position of the pixel of interest to x and luminance information (luminance value) representing a luminance of the pixel of interest as f(x). Then, the CPU 401 calculates a luminance difference g(x) of pixels located at a position x+H1 and a position x−H1, which are separated from the pixel of interest by a first distance H1 in the main scanning direction (direction in which the original edge is detected) (Step S505). The luminance difference g(x) can be calculated by Expression (1).

$$g(x)=f(x+H1)-f(x-H1) \qquad \text{Expression (1)}$$

The CPU 401 compares the luminance difference g(x) calculated in the processing of Step S505 with a first threshold value TH1 to determine whether or not the luminance difference g(x) is larger than a first threshold value TH1 with a plus sign in front (+TH1) (Step S506). When the CPU 401 determines that the luminance difference g(x) is equal to or smaller than the first threshold value TH1 with a plus sign in front (+TH1) (Step S506: No), the CPU 401 determines whether or not the luminance difference g(x) is smaller than a first threshold value TH1 with a minus sign in front (−TH1) (Step S507).

The illumination units 201a and 201b obliquely radiate light to the original. Therefore, a shadow may be caused at the original edge depending on the thickness of the original. A luminance difference is caused between the original edge and the original pressing member 105 due to the shadow. Step S506 and Step S507 are processing for detecting this luminance difference.

At an edge pixel at the original end portion (hereinafter referred to as "original edge pixel"), a luminance difference is caused due to the shadow, and hence the following relationship is obtained: (luminance difference g(x))>+TH1 or (luminance difference g(x))<−TH1. However, when no original is placed, no luminance difference is caused by the original pressing member 105, or the luminance difference is a very small value. In this case, the luminance difference g(x) has a relationship of −T1≤g(x)≤+TH1.

The first threshold value TH1 is desired to be a small value so as to support even an original having a small basis weight and causing less shade.

When (luminance difference g(x))>+TH is satisfied (Step S506: Yes), the CPU 401 calculates each of luminance differences g(x+1), g(x+2), . . . , and g(x+n) (hereinafter referred to as "luminance differences g(x+n)") in a range to a pixel separated by a predetermined distance n on the outer side in the main scanning direction (Step S508). The CPU 401 determines whether or not there is a luminance difference that is smaller than the first threshold value TH1 with a minus sign in front (−TH1) in the respective luminance differences g(x+n) calculated in the processing of Step S508 (Step S509).

When (luminance difference g(x))<−TH1 is satisfied, that is, when it is determined that the luminance difference g(x+n) is smaller than the first threshold value TH1 with a minus sign in front (−TH1) (Step S507: Yes), the CPU 401 calculates each of luminance differences g(x−1), g(x−2), . . . , and g(x−n) (hereinafter referred to as "luminance differences g(x−n)") in a range to a pixel separated by the predetermined distance n on the inner side in the main scanning direction (Step S510). The CPU 401 determines whether or not there is a luminance difference that is larger than the first threshold value TH1 with a plus sign in front (+TH1) in the respective luminance differences g(x-n) calculated in the processing of Step S510 (Step S511). Step S508 to Step S511 are processing for preventing false detection to be caused when the pixel of interest is a pixel on a white streak.

The original edge pixel and the white streak pixel are different in how the sign of the luminance difference g(x) changes. The shadow at the original edge has a lower luminance than those of surrounding pixels. Therefore, the sign of the luminance difference g(x) changes from plus to minus as viewed from the outer side in the main scanning direction. The white streak pixel has a higher luminance than those of surrounding pixels. Therefore, the sign of the luminance difference g(x) changes from minus to plus as viewed from the outer side in the main scanning direction (see parts (a) and (b) of FIG. 7 to be referred to later).

When the determination result in the processing of Step S509 or the processing of Step S511 is "Yes", it means that the sign of the luminance difference g(x) changes from minus to plus as viewed from the outer side in the main scanning direction. As described above, the CPU 401 can distinguish (recognize) the original edge pixel and the white streak pixel by the processing from Step S508 to Step S511.

Referring back to the description of FIG. 5, when the CPU 401 determines that (luminance difference g(x))<−TH1 is not satisfied (Step S507: No), the CPU 401 sets a first determination result R1 to "0" (Step S512). Further, when the determination result in the processing of Step S509 and the processing of Step S511 is "Yes", the CPU 401 sets the first determination result R1 to "0" (Step S512). When the determination result in the processing of Step S509 and the processing of Step S511 is "No", the CPU 401 sets the first determination result R1 to "1" (Step S513). The determination in the processing from Step S505 to Step S513 is herein referred to as "first determination".

In the first determination, when the pixel of interest is a pixel of the original pressing member 105 (no original is placed), −TH1 ≤g(x) ≤+TH1 is obtained, and the first determination result R1 is "0" (determination result in the processing of Step S507 is "No").

When the pixel of interest is the white streak pixel (see part (b) of FIG. 7 to be referred to later), g(x) >+TH1 or g(x) <−TH1 is obtained, and the luminance difference g(x) changes from minus to plus as viewed from the outer side in the main scanning direction. Therefore, the first determination result R1 is "0" (determination result in the processing of Step S509 and Step S511 is "Yes").

When the pixel of interest is the original edge pixel (see part (a) of FIG. 7 to be referred to later), g(x) >+TH1 or g(x) <−TH1 is obtained, and the luminance difference g(x) changes from plus to minus as viewed from the outer side in the main scanning direction. Therefore, the first determination result R1 is "1" (determination result in the processing of Step S509 and Step S511 is "No"). Also when the pixel of interest is a pixel of dust, hair, or other dirt (see part (c) of FIG. 7 to be referred to later), the first determination result R1 is "1".

The CPU 401 uses a second distance H2 that is larger than the first distance H1 to calculate a difference h(x) between the maximum luminance value and the minimum luminance value of pixels that are present within a range to pixels separated from the pixel of interest by H2 in the main scanning direction (Step S514). The difference h(x) can be calculated by Expression (2).

$$h(x)=\max(f(x-H2), \ldots, f(x), \ldots, f(x+H2))-\min(f(x-H2), \ldots, f(x), \ldots, f(x+H2))$$ Expression (2)

The CPU 401 determines whether or not the difference h(x) is smaller than a second threshold value TH2 (Step S515). The shadow caused at the original edge and dust, hair, or other dirt often has a difference in feature of luminance. The former is not a clear shadow but a blurred shadow due to the influence of diffusion light of the illumination units 201a and 201b. Therefore, the luminance is not so low.

The latter has a low luminance because the dirt itself is often dark. Therefore, h(x) is small in the former, and h(x) is large in the latter. The CPU 401 can distinguish (recognize) those two by setting an appropriate threshold value.

When the CPU 401 determines that (difference h(x)) <TH2 is not satisfied, that is, the difference h(x) is equal to or larger than the second threshold value TH2 (Step S515: No), the CPU 401 sets a second determination result R2 to "0" (Step S516). Otherwise (Step S515: Yes), the CPU 401 sets the second determination result R2 to "1" (Step S517). The determination in the processing from Step S514 to Step S517 is herein referred to as "second determination".

In the second determination, when the pixel of interest is the original edge pixel (see part (a) of FIG. 7 to be referred to later), h(x)<TH2 is obtained due to the blurred shadow, and the second determination result R2 is "1". Further, when the pixel of interest is a pixel of dust, hair, or other dirt (see part (c) of FIG. 7 to be referred to later), h(x)≥TH2 is obtained, and the second determination result R2 is "0".

The first determination and the second determination have a large difference in a range from the pixel of interest. That is, the second distance H2 is required to be larger than the first distance H1 (H2>H1). In the following case, it is assumed that H2=H1 and a determination is executed such that the first determination and the second determination is combined. This means that the determination result thereof is set to "1" only when the difference in luminance value is between the first threshold value TH1 and the second threshold value TH2. In this case, the original edge and the dust, hair, or other dirt cannot be distinguished. This is due to the fact that the dust, hair, or other dirt has low luminance, however, the luminance is not abruptly decreased, and a part with a gentle luminance change always appears.

That is, when the first determination and the second determination are executed in the same range, the determination result does not change between the original edge part and the part with a gentle luminance change of the dust, hair, or other dirt. In order to address such a problem, the image reading apparatus 10 according to the first embodiment sets the range of the second determination to be larger than that of the first determination so as to include even the part with a low luminance of the dust, hair, or other dirt as a target for calculating the difference h(x). In this manner, the determination results can be different therebetween, and the CPU 401 can distinguish (recognize) those two parts.

The CPU 401 determines whether or not a product R (R=R1·R2) of the first determination result R1 and the second determination result R2 is "1" (Step S518). When the pixel of interest is the original edge pixel, R1=1 and R2=1 are obtained, and hence R=1 is obtained. When the pixel of interest is the dirt pixel, R1=1 and R2=0 are obtained, and hence R=0 is obtained. When the pixel of interest is the white streak pixel, R1=0 is obtained, and hence R=0 is obtained regardless of the value of R2. The product may not be used when it is determined whether or not both of the first determination result and the second determination result have predetermined results.

When the CPU 401 determines that the value of R is not "1" (Step S518: No), the CPU 401 determines the pixel of interest as a non-original edge pixel (Step S519). The CPU 401 newly sets a pixel on an inner side of the pixel of interest by one pixel in the main scanning direction as the pixel of interest (Step S520), and determines whether or not the main scanning position of the newly set pixel of interest is outside of a range of original edge detection in the main scanning direction (Step S521). When the main scanning position of the pixel of interest is not outside of the range of original edge detection in the main scanning direction (Step S521: No), the CPU 401 returns to the processing of Step S505. Otherwise (Step S521: Yes), the original P is not placed, and hence the CPU 401 determines that the original size is undetermined (Step S522).

When the CPU 401 determines that the value of R is "1" (Step S518: Yes), the CPU 401 determines the pixel of interest as an original edge pixel (Step S523). The CPU 401 sets the main scanning position of the original edge pixel as an original edge position (Step S524). The CPU 401 determines the original size based on the original edge position (Step S525). It is assumed that the original P is placed so that the upper left corner of the original matches with the reference position 303 of the original table glass 102. When the length from the reference position 303 to the original edge position matches with or is close to any of respective standard sizes of sheets, the CPU 401 determines that a standard original is placed, and sets the standard size as the original size.

When the length from the reference position 303 to the original edge position does not match with any of the respective standard sizes of the sheets, the CPU 401 determines that a non-standard original is placed, and sets a closest standard size that is larger than the length from the reference position 303 to the original edge as the original size. In this manner, the information of the original can be prevented from being lacked when the non-standard original is printed.

As described above, the image reading apparatus 10 according to the first embodiment executes, in the original size detection, original edge detection from the outer side to the inner side in the main scanning direction, and ends the original size detection processing after the original edge is detected. The image reading apparatus 10 can detect the original edge (original end portion) with high accuracy without being affected by the image information in the original even when dust, hair, or other dirt adheres to the original table glass 102 or the original pressing member 105 or when the shading white plate gets dirty.

Second Embodiment

In a second embodiment of the present invention, a description is given of an image reading apparatus 10 that is capable of detecting the original edge with high accuracy even in the case of a black original with no margin. Like functions and configurations as those already described in the first embodiment are denoted by like reference symbols, and description thereof is omitted herein.

Figure 6:
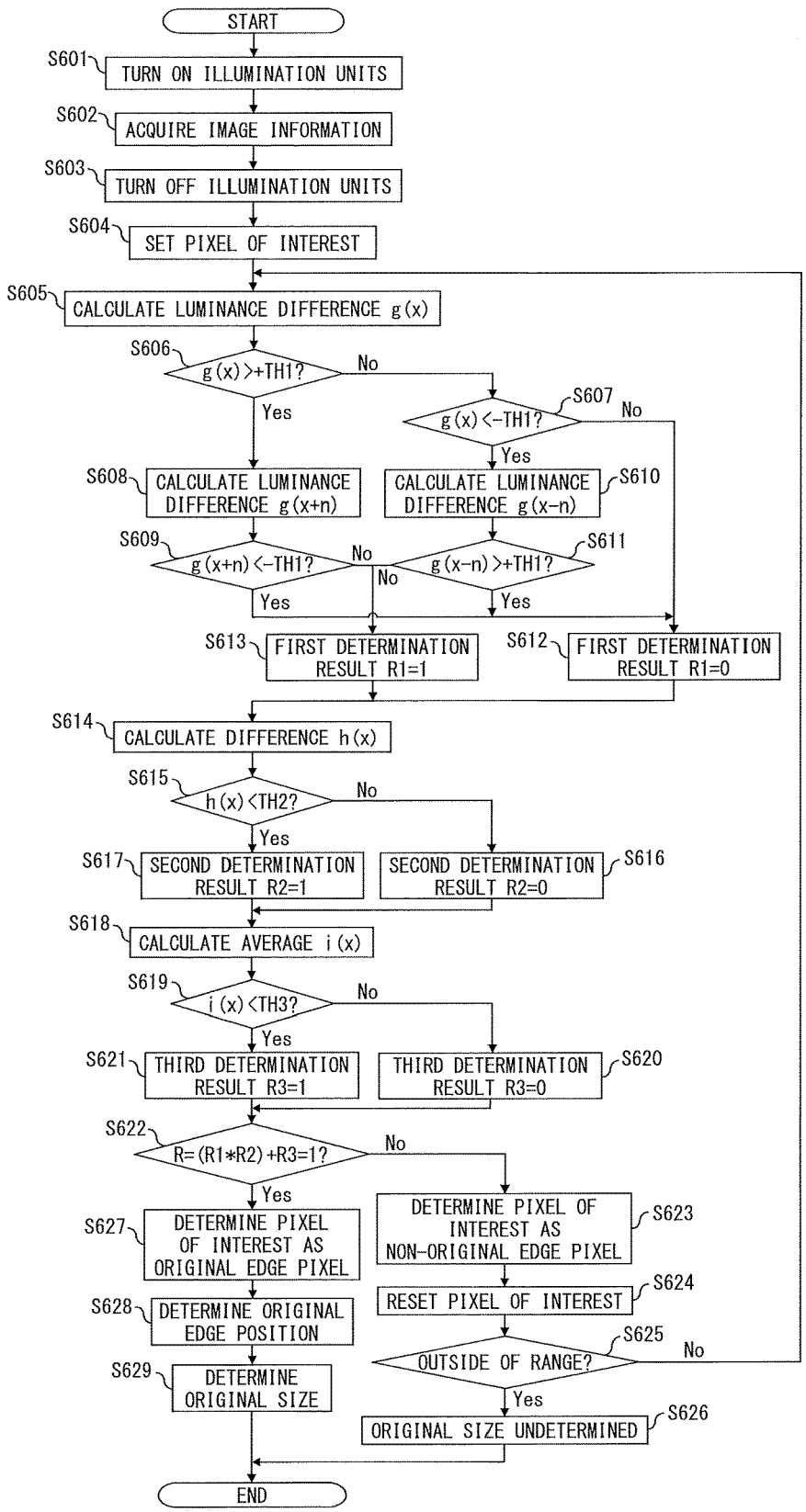
FIG. 6 is a flow chart for illustrating an example of a processing procedure of original size detection processing to be performed by an image reading apparatus according to a second embodiment of the present invention.

FIG. 6 is a flow chart for illustrating an example of a processing procedure of original size detection processing to be performed by the image reading apparatus 10 according to the second embodiment. Each step of processing from Step S601 to Step S617 illustrated in FIG. 6 is similar to each step of processing from Step S501 to Step S517 described with reference to FIG. 5, and hence description thereof is omitted herein. Similarly, each step of processing from Step S623 to Step S629 illustrated in FIG. 6 is similar to each step of processing from Step S519 to Step S525 illustrated in FIG. 5, and hence description thereof is omitted herein. Further, each step of processing illustrated in FIG. 6 is mainly executed by the CPU 401.

The CPU 401 calculates an average i(x) of luminance values of pixels within a range to pixels separated from the pixel of interest by a third distance H3 in the main scanning direction (Step S618). The average i(x) can be calculated by Expression (3).

$$i(x)=\text{ave}(f(x+H3), \ldots, f(x), \ldots, f(x-H3)) \qquad \text{Expression (3)}$$

The CPU 401 determines whether or not the average i(x) is smaller than a third threshold value TH3 (Step S619). For example, when an average of luminance values of pixels within a range that is large to some extent in the main scanning direction in the vicinity of the original edge is calculated, an original like a black original having no margin has a small average value. This is because the luminance value at the end portion of the black original is dominant. In the case of dust, hair, or other dirt, a large average value is obtained. This is because dust, hair, or other dirt is often small or often has a streak shape, and hence, when the average of the luminance values is calculated in a range that is large to some extent, only small influence is caused by the luminance of the dirt, and the white luminance of the original pressing member 105 is dominant. Therefore, the CPU 401 can distinguish (recognize) the two cases by setting an appropriate threshold value.

When the CPU 401 determines that the average i(x) is equal to or larger than the third threshold value TH3 (Step S619: No), the CPU 401 sets a third determination result R3 to "0" (Step S620). Otherwise (Step S619: Yes), the CPU 401 sets the third determination result R3 to "1" (Step S621). In this case, the determination in processing from Step S618 to Step S621 is referred to as "third determination".

In the third determination, when the pixel of interest is an original edge pixel of the black original (see part (d) of FIG. 7 to be referred to later), i(x)<TH3 is obtained, and R3=1 is obtained. When the pixel of interest is a pixel of dust, hair, or other dirt (see part (c) of FIG. 7 to be referred to later), i(x)≥TH3 is obtained, and R3=0 is obtained. When the pixel of interest is a white streak pixel (see part (b) of FIG. 7 to be referred to later), the white streak and the white color of the original pressing member 105 are dominant. Thus, i(x)≥TH3 is obtained, and R3=0 is obtained.

The CPU 401 determines whether or not a sum R (R=(R1·R2)+R3) of the product of the first determination result R1 and the second determination result R2 and the third determination result R3 is "1" (Step S622). For example, when the pixel of interest is the original edge pixel of the original having a margin, R1=1, R2=1, and R3=0 are obtained, and hence R=1 is obtained. When the pixel of interest is the pixel of dust, hair, or other dirt, R1=1, R2=0, and R3=0 are obtained, and hence R=0 is obtained. When the pixel of interest is the original edge pixel of the original having no margin, R1=1, R2=0, and R3=1 are obtained, and hence R=1 is obtained. When the pixel of interest is the white streak pixel, R1=0 and R3=0 are obtained, and hence R=0 is obtained.

Figure 7:
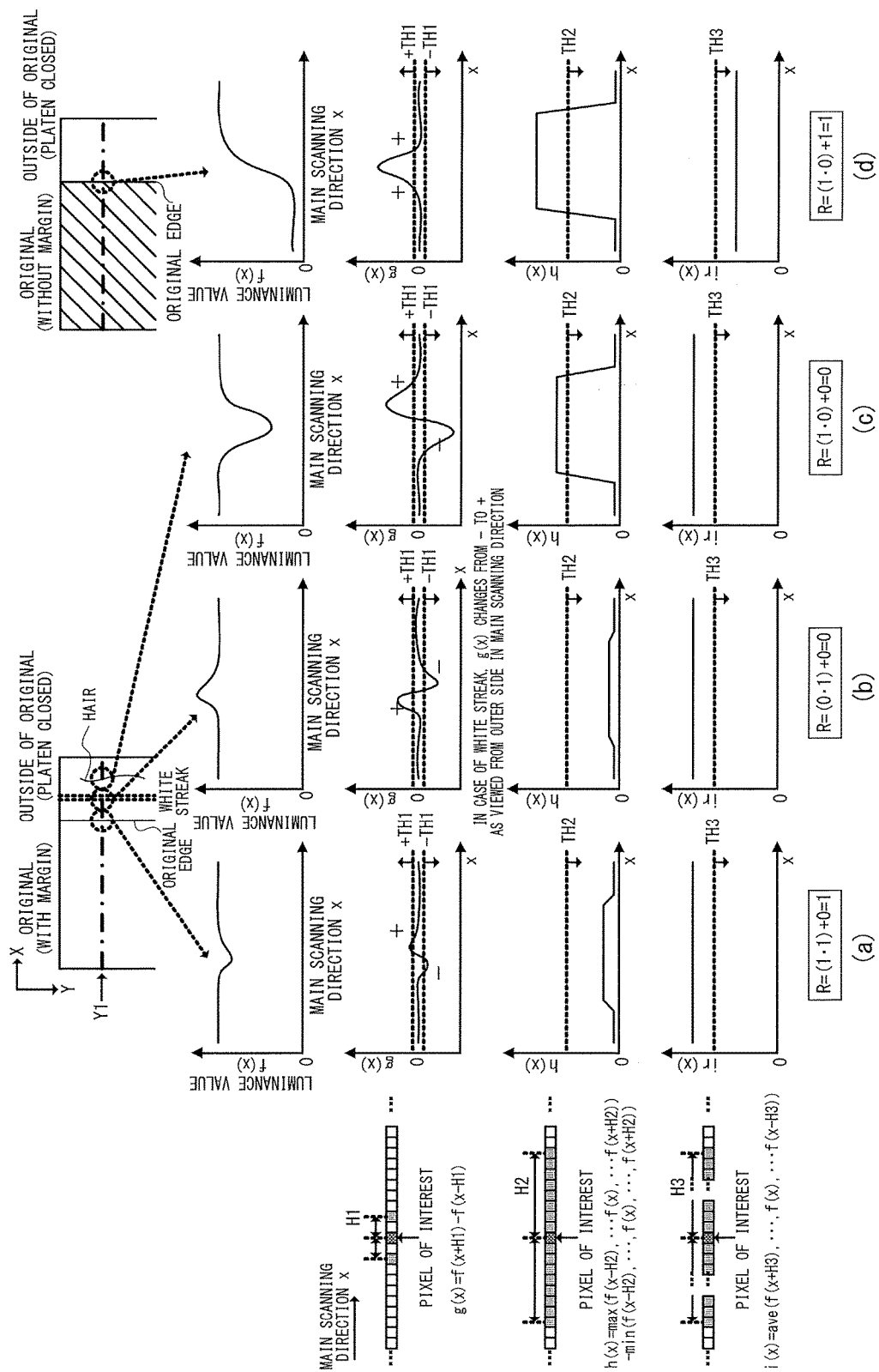
FIG. 7 is a graph for showing a relationship among a luminance value f(x) and g(x), h(x), and i(x) calculated in respective determinations in the original size detection processing.

FIG. 7 is a graph for showing a relationship among a luminance value f(x) and g(x), h(x), and i(x) calculated in respective determinations in the original size detection processing. An arrow X of FIG. 7 represents the main scanning direction (direction in which the original edge is detected), and an arrow Y represents the sub-scanning direction (direction perpendicular to the main scanning direction).

The graphs shown in FIG. 7 are graphs of, from the left, (a) a vicinity of an original edge position of an original having a margin, (b) a vicinity of a position of a white streak, (c) a vicinity of a position of hair, and (d) a vicinity of an original edge position of a black original having no margin. The graphs shown in FIG. 7 represent, in order from the top, f(x), g(x), h(x), and i(x).

As shown in FIG. 7, the change of the sign of the luminance difference g(x) as viewed from the outer side in the main scanning direction differs between the original edge pixel of the original having a margin and the white streak pixel. When only a portion at which the sign of the luminance difference g(x) changes from plus to minus as viewed from the outer side in the main scanning direction is set to the original edge pixel, the original edge and the white streak can be distinguished, that is, those two can be recognized.

The shadow caused at the original edge of the original having a margin is not a clear shadow but a blurred shadow due to the influence of diffusion light of the illumination units 201a and 201b. Therefore, the luminance is not so low. Therefore, the difference h(x) does not exceed the second threshold value TH2.

The hair itself is often dark, and hence the luminance is low and the difference h(x) exceeds the second threshold value TH2. Therefore, when the second determination of calculating the difference h(x) is performed, the original edge of the original having a margin and the hair can be distinguished.

Hair often has a streak shape, and hence the white luminance value of the original pressing member 105 is dominant when the luminance value is acquired in a range that is large to some extent. The average i(x) exceeds the third threshold value TH3.

In the original edge of the black original having no margin, the luminance value at the end portion of the black original is dominant when the luminance value is acquired in a range that is large to some extent. Thus, the average i(x) falls below the third threshold value TH3. Therefore, when the third determination of calculating the average i(x) is performed, the hair and the black original having no margin can be distinguished.

Third Embodiment

The above-mentioned image reading apparatus 10 acquires the image information of the original for a plurality of lines in the main scanning direction when the reading unit 103 moves from the original size detection position Y1 to the original reading start position Y2, to thereby detect the original edge from the image information for one line in the main scanning direction. In a third embodiment of the present invention, a description is given of an image reading apparatus 10 configured to perform the processing of detecting the original edge a plurality of times in a direction (sub-scanning direction) perpendicular to the direction (main scanning direction) in which the original edge is detected. Like functions and configurations as those already described in the first and second embodiments are denoted by like reference symbols, and description thereof is omitted herein.

When the original edge is to be detected, even if dirt that causes false detection in the case of one line in the main scanning direction is present, the dirt rarely continues in the sub-scanning direction at the same main scanning position. Further, the original edge pixel is linearly distributed in the sub-scanning direction. Therefore, the original edge can be detected with higher accuracy when the image reading apparatus 10 is configured as in the third embodiment.

Figure 8:
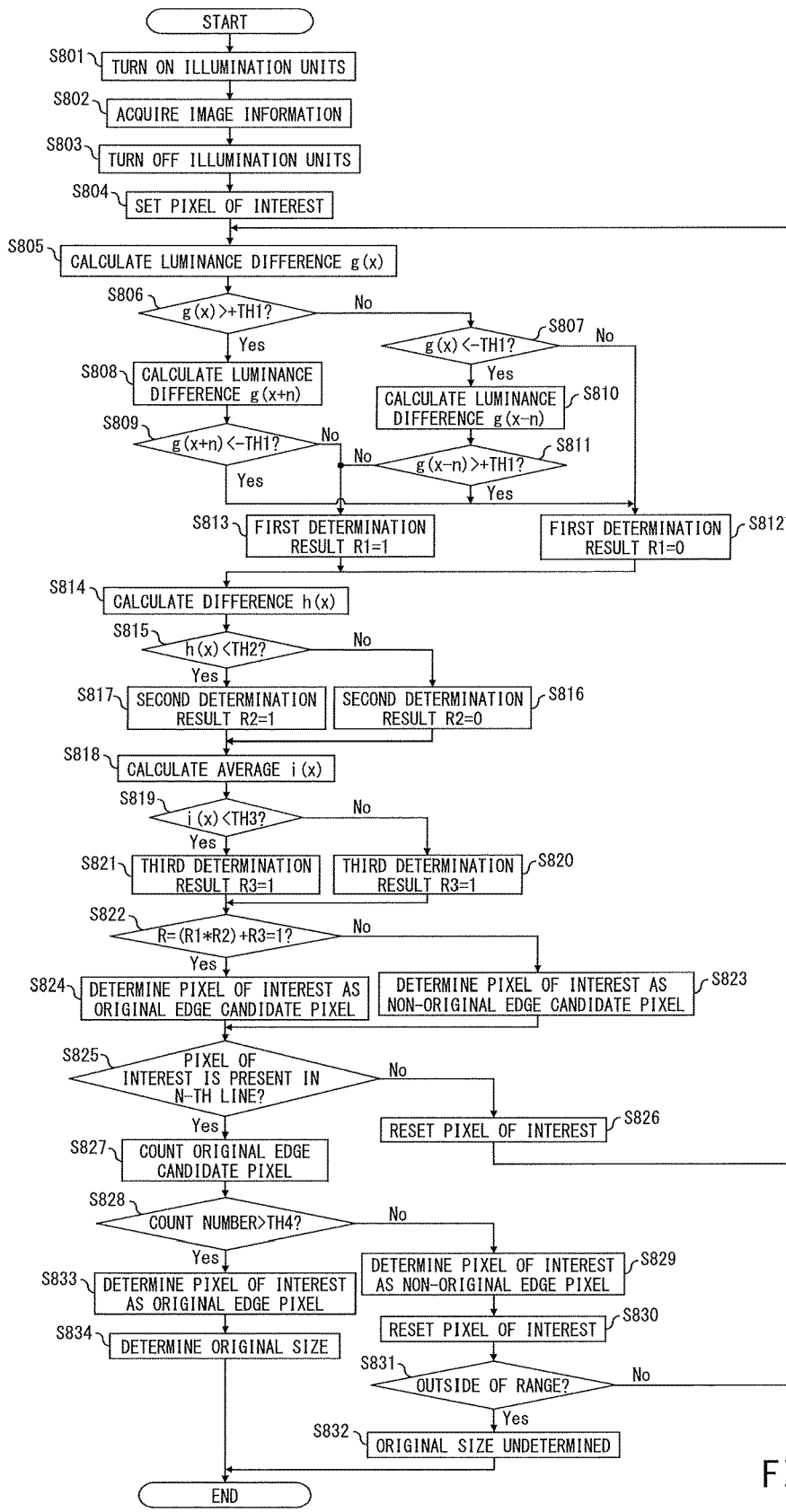
FIG. 8 is a flow chart for illustrating an example of a processing procedure of original size detection processing to be performed by an image reading apparatus according to a third embodiment of the present invention.

FIG. 8 is a flow chart for illustrating an example of a processing procedure of original size detection processing to be performed by the image reading apparatus 10 according to the third embodiment. Each step of processing illustrated in FIG. 8 is mainly executed by the CPU 401.

The CPU 401 turns on the illumination units 201a and 201b (Step S801). The CPU 401 acquires the image information of the original for a plurality of lines (N lines in the sub-scanning direction) in the main scanning direction (Step S802). The CPU 401 turns off the illumination units 201a and 201b (Step S803). The CPU 401 sets, as the pixel of interest, a pixel on the outermost side in the original edge detection range in the main scanning direction of the first line (Step S804). Each step of processing from Step S805 to Step S822 illustrated in FIG. 8 is similar to each step of processing from Step S605 to Step S622 illustrated in FIG. 6, and hence description thereof is omitted herein.

When the sum R (R=(R1·R2)+R3) of the product of the first determination result R1 and the second determination result R2 and the third determination result R3 is not "1" (Step S822: No), the CPU 401 determines the pixel of interest as a non-original edge candidate pixel (Step S823). Otherwise (Step S822: Yes), the CPU 401 determines the pixel of interest as an original edge candidate pixel (Step S824).

The CPU 401 determines whether or not the pixel of interest is present in the N-th line (Step S825). When the CPU 401 determines that the pixel of interest is not present in the N-th line (Step S825: No), the CPU 401 resets a pixel that is located at the same position in the main scanning direction as the pixel of interest and is shifted by one line in the sub-scanning direction as the pixel of interest (Step S826), and then returns to the processing of Step S805.

When the CPU 401 determines that the pixel of interest is present in the N-th line (Step S825: Yes), the CPU 401 counts the number of times that the pixel of interest is determined as the original edge candidate pixel in the N lines in the sub-scanning direction at the position in the main scanning direction of the pixel of interest (Step S827). The CPU 401 determines whether or not the count number in the processing of Step S827 is larger than a fourth threshold value TH4 (Step S828). In this manner, even when dirt that causes false detection in the case of one line appears, the CPU 401 can detect the original edge with high accuracy while the influence of the dirt is suppressed.

When the count number is equal to or smaller than the fourth threshold value TH4 (Step S828: No), the CPU 401 determines the main scanning position of the pixel of interest as the non-original edge position (Step S829). The CPU 401 resets a pixel located in the first line and on the inner side of the pixel of interest by one pixel in the main scanning direction as the pixel of interest (Step S830). Each step of processing of Step S831 and Step S832 illustrated in FIG. 8 is similar to each step of processing of Step S625 and Step S626 illustrated in FIG. 6, and hence description thereof is omitted herein.

When the count number is larger than the fourth threshold value TH4 (Step S828: Yes), the CPU 401 determines the position in the main scanning direction of the pixel of interest as the original edge position (Step S833). A step of processing of Step S834 illustrated in FIG. 8 is similar to the step of processing of Step S629 illustrated in FIG. 6, and hence description thereof is omitted herein.

Figure 9:
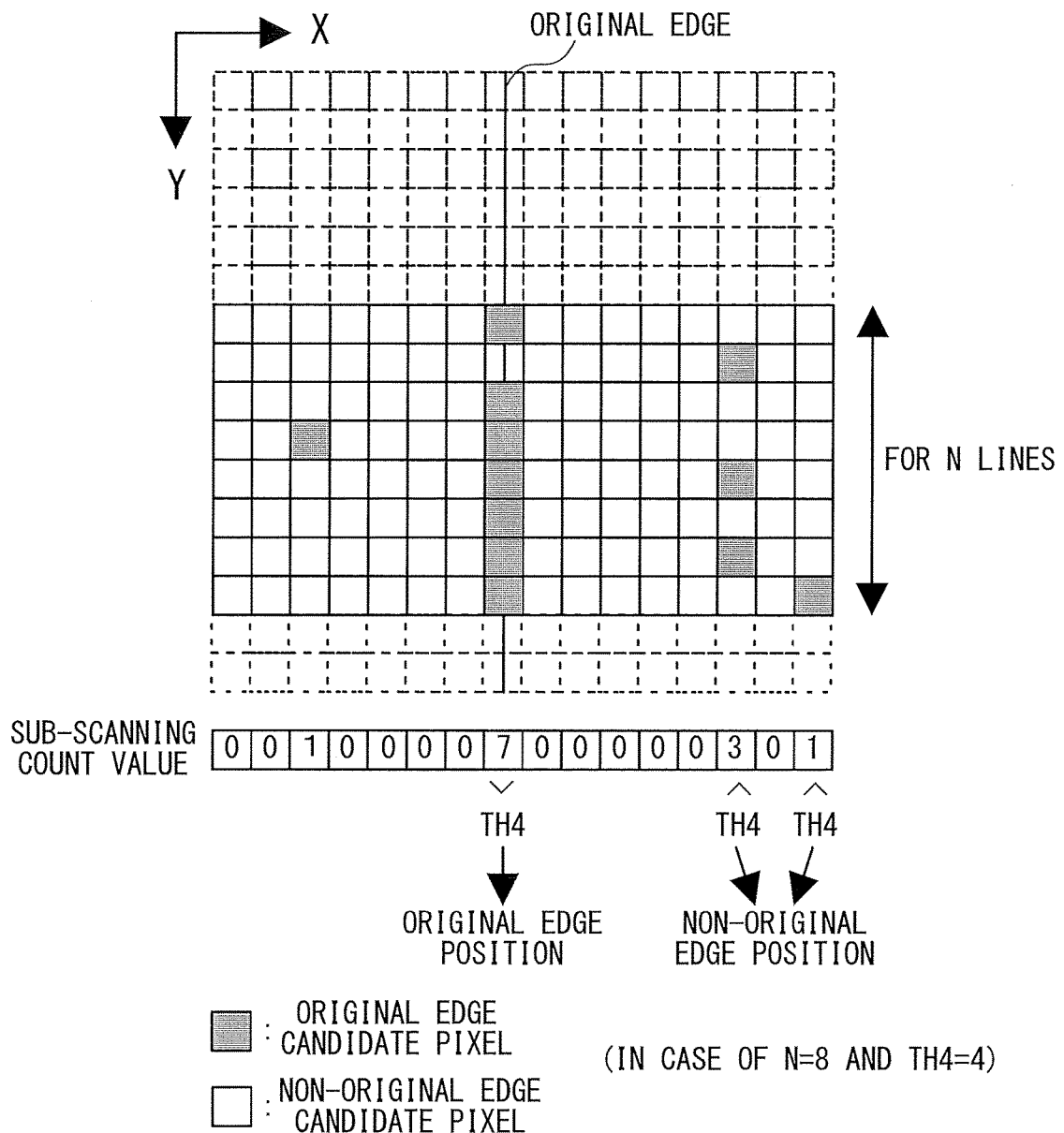
FIG. 9 is a diagram for illustrating an example of original edge detection processing.

FIG. 9 is a diagram for illustrating an example of original edge detection processing of the third embodiment. An arrow X of FIG. 9 represents the main scanning direction, and an arrow Y represents the sub-scanning direction. Following description is made assuming that the original edge illustrated in FIG. 9 is to be detected.

As illustrated in FIG. 9, the image reading apparatus 10 according to the third embodiment detects the original edge when the original edge candidate pixel is counted successively for a predetermined number of times in the sub-scanning direction. Therefore, even when dirt appears, the image reading apparatus 10 can detect the original edge with high accuracy while the influence of the dirt is suppressed.

Fourth Embodiment

An image reading apparatus 10 according to a fourth embodiment of the present invention acquires the image information of the original for a plurality of lines in the main scanning direction at each of a plurality of positions separated by a predetermined distance in the sub-scanning direction when the reading unit 103 moves from the original size detection position Y1 to the original reading start position Y2, to thereby detect the original edge. Like functions and configurations as those already described in the first, second, and third embodiments are denoted by like reference symbols, and description thereof is omitted herein.

Even when dirt that causes false detection in the original edge detection processing described in the third embodiment is present, the dirt is rarely present on a straight line at a distance separated in the sub-scanning direction. Further, the original edge pixels are linearly distributed in the sub-scanning direction. Therefore, the original edge can be detected with higher accuracy when the image reading apparatus 10 is configured as in the fourth embodiment.

Figure 10:
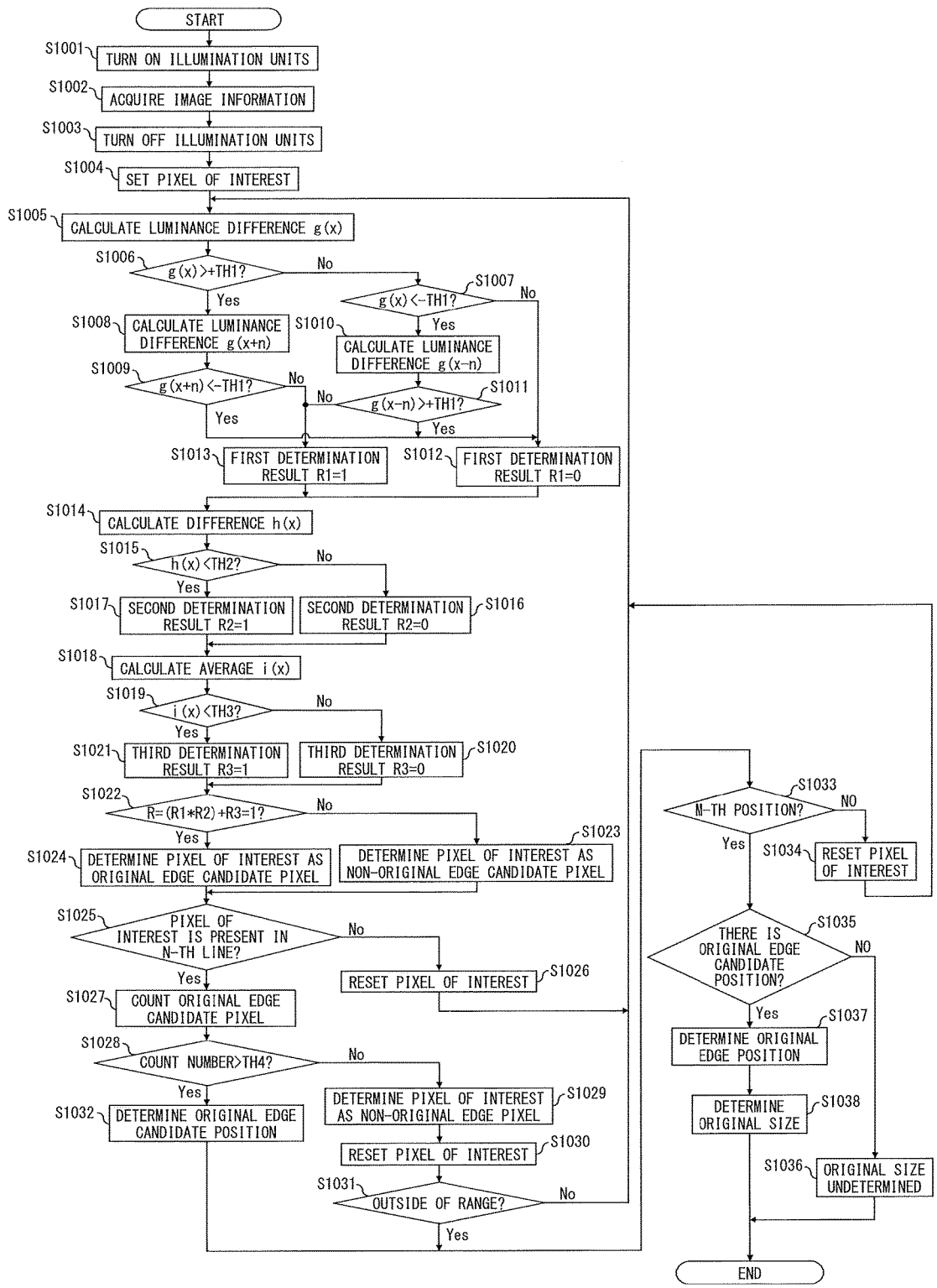
FIG. 10 is a flow chart for illustrating an example of a processing procedure of original size detection processing to be performed by an image reading apparatus according to a fourth embodiment of the present invention.

FIG. 10 is a flow chart for illustrating an example of a processing procedure of original size detection processing to be performed by the image reading apparatus 10 according to the fourth embodiment. Each step of processing illustrated in FIG. 10 is mainly executed by the CPU 401.

The CPU 401 turns on the illumination units 201a and 201b (Step S1001). The CPU 401 acquires the image information of the original for a plurality of lines (N lines in the sub-scanning direction) in the main scanning direction at M positions separated by a predetermined distance in the sub-scanning direction (Step S1002). The CPU 401 turns off the illumination units 201a and 201b (Step S1003). The CPU 401 sets, as the pixel of interest, a pixel on the outermost side in the original edge detection range in the main scanning direction of the first position and the first line (Step S1004). Each step of processing from Step S1005 to Step S1031 illustrated in FIG. 10 is similar to each step of processing from Step S805 to Step S831 illustrated in FIG. 8, and hence description thereof is omitted herein.

When the CPU 401 determines that the count number is larger than the fourth threshold value TH4 (Step S1028: Yes), the CPU 401 determines the main scanning position of the pixel of interest as the original edge candidate position (Step S1032). The CPU 401 determines whether or not the pixel of interest is present at the M-th position (Step S1033). That is, the CPU 401 determines whether or not the original edge detection is ended at all positions separated in the sub-scanning direction.

When the pixel of interest is not present at the M-th position (Step S1033: No), the CPU 401 resets a pixel that is located at another position separated in the sub-scanning direction and on the outermost side in the original edge detection range in the main scanning direction of the first line as the pixel of interest (Step S1034), and returns to the processing of Step S1005.

When the pixel of interest is located at the M-th position (Step S1033: Yes), the CPU 401 determines whether or not any one original edge candidate position is present in the result of the original edge detection at the M positions (Step S1035).

When the original edge candidate position is not present (Step S1035: No), the original is not placed, and hence the CPU 401 determines that the original size is undetermined (Step S1036). Otherwise (Step S1035: Yes), the CPU 401 determines the original edge position based on the original edge candidate positions at the M positions (Step S1037). The processing of Step S1038 illustrated in FIG. 10 is similar to the processing of Step S834 illustrated in FIG. 8, and hence description thereof is omitted herein.

Figure 11:
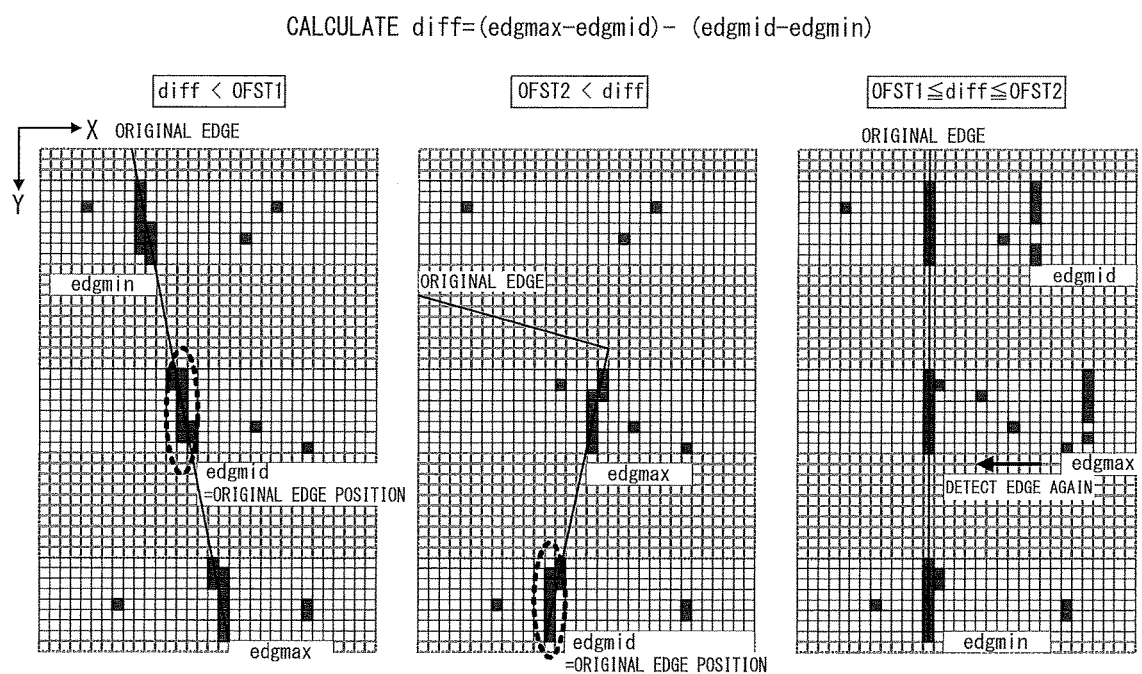
FIG. 11 is a diagram for illustrating processing of Step S1037 illustrated in FIG. 10 (processing of determining an original edge position based on an original edge candidate position).

FIG. 11 is a diagram for illustrating the processing of Step S1037 illustrated in FIG. 10 (processing of determining the original edge position based on the original edge candidate position). The arrow X of FIG. 11 represents the main scanning direction, and the arrow Y represents the sub-scanning direction. M=3 is set as the M positions separated in the sub-scanning direction, and the positions are separated at equal intervals in the sub-scanning direction. Following description is made assuming that the original edge illustrated in FIG. 11 is to be detected.

As illustrated in FIG. 11, the original edge candidate positions detected at the three positions separated at equal intervals in the sub-scanning direction are represented by edgmax, edgmid, and edgmin in descending order of the position in the main scanning direction. The CPU 401 calculates a difference diff=(edgmax−edgmid)−(edgmid−edgmin) of intervals of the original edge candidate positions. The difference diff differs depending on how the original is placed. Therefore, the CPU 401 determines the original edge position based on the difference diff.

The original edge generally has a straight line. Therefore, when the original is placed so that the upper left corner matches with the reference position 303, or even when the original is not properly placed and placed obliquely on the original table glass 102, the value of the difference diff is very small. For example, when the original is placed so that the upper left corner matches with the reference position 303, the original edge candidate positions at the three positions are at the same position in the main scanning direction. Further, when the original is obliquely placed, the intervals of the three original edge detection positions in the sub-scanning direction are equal, and hence the intervals of the original edge candidate positions in the main scanning direction are equal based on a similarity relationship.

Considering a case in which the original edge slightly has irregularities, the CPU 401 determines that the original edge is properly detected when diff<OFST1 is satisfied, and sets the position of edgmid as the original edge position. OFST1 is a relatively small value.

The original may not be placed at one of the original edge detection positions. Further, the original may be placed so that one side of the original is not in contact with the main scanning original size index 301. At those times, the difference diff has a very large value. This is because the original edge cannot be detected at the original edge detection position at which the original is not placed, and hence the value of edgmin is very small. Therefore, when diff>OSFT2 is satisfied, the CPU 401 determines that the original is not placed at one of the original edge detection positions, and sets the detection result at the remaining two positions, that is, the position of edgmid as the original edge position. OFST2 is a relatively large value.

False detection may occur at the original edge detection position. At this time, the difference diff tends to have neither a small value nor a large value. Therefore, when OFST1≤diff≤OFST2 is satisfied, the CPU 401 determines that there is an original edge detection position at which false detection is occurring. Then, the CPU 401 performs edge detection again at a position at which edgmax is detected, and calculates the difference diff again based on the newly acquired original edge candidate position and the remaining two original edge candidate positions, to thereby determine the original edge position.

In the description of the respective embodiments above, the original edge in the main scanning direction of the original is detected, but the original edge in the sub-scanning direction can be similarly detected. The image reading apparatus 10 of the respective embodiments described above can detect the size of the original with high accuracy while the user is prevented from feeling dazzled.

Image Forming Processing

Figure 12:
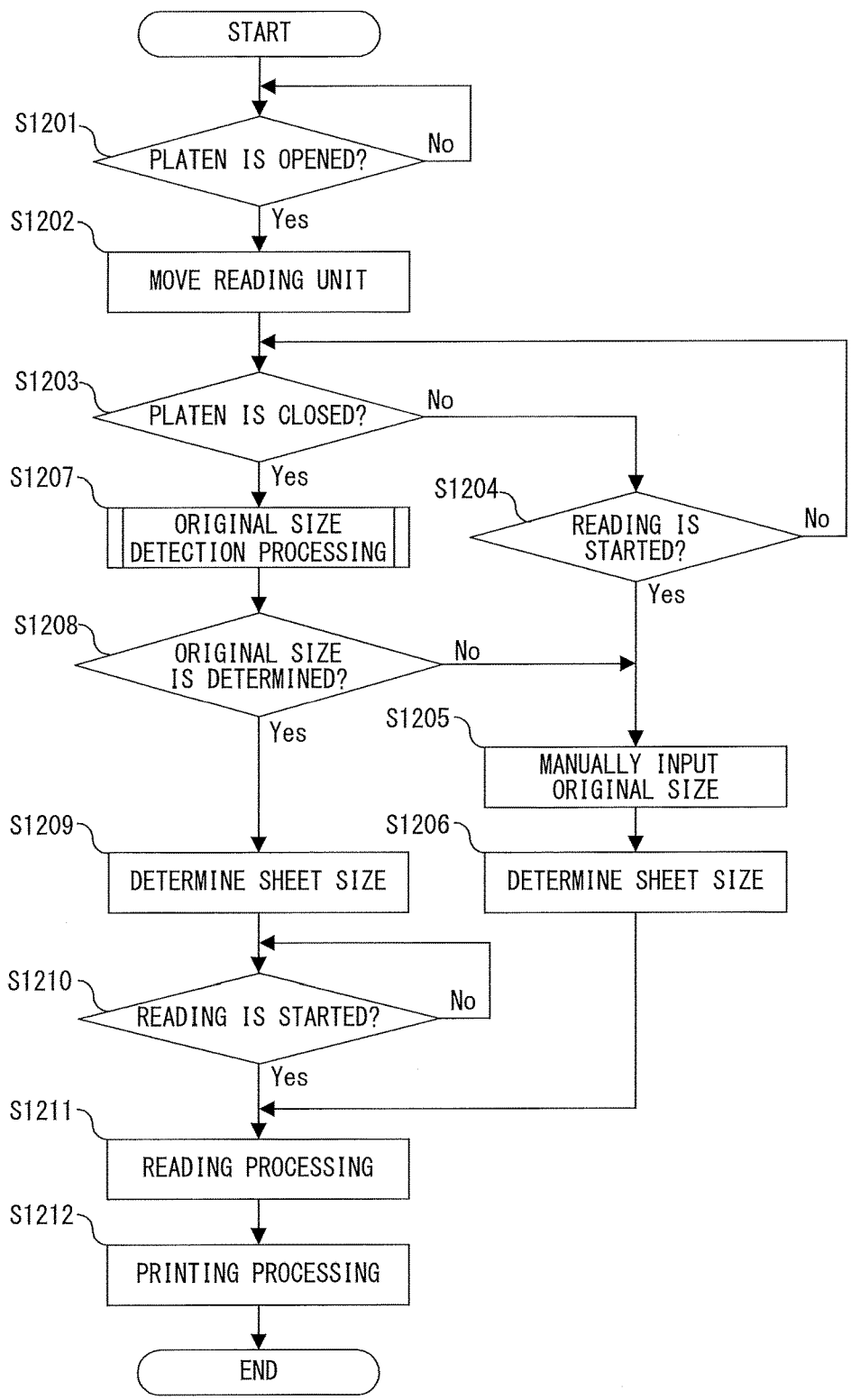
FIG. 12 is a flow chart for illustrating an example of a processing procedure from original reading to image formation in the image forming system.

FIG. 12 is a flow chart for illustrating an example of a processing procedure from original reading to image formation in the image forming system 152. Each step of processing illustrated in FIG. 12 is mainly executed by the CPU 401.

The CPU 401 determines whether or not the platen 104 is changed from the closed state to the open state (Step S1201). When the CPU 401 determines that the platen 104 is changed to the open state (Step S1201: Yes), the CPU 401 moves the reading unit 103 to the original size detection position Y1 (Step S1202).

The CPU 401 determines whether or not the platen 104 is changed from the open state to the closed state (Step S1203). When the CPU 401 determines that the state of the platen 104 is not changed (Step S1203: No), the CPU 401 determines whether or not the start button of the operation unit 412 is pressed to issue an instruction of the start of reading (Step S1204).

When the CPU 401 determines that the start button is not pressed (Step S1204: No), the CPU 401 returns to the processing of Step S1203. Otherwise (Step S1204: Yes), the original size is undetermined, and hence the CPU 401 presents, to the user, information for urging the user to input the original size via the operation unit 412 (Step S1205). The CPU 401 determines the sheet size based on the original size input by the processing of Step S1205 (Step S1206).

When the CPU 401 determines that the state of the platen 104 is changed (Step S1203: Yes), the CPU 401 performs the original size detection processing (Step S1207). The original size detection processing is the processing already described with reference to FIG. 5, FIG. 6, FIG. 8, and FIG. 10.

The CPU 401 determines whether or not the original size is determined by the original size detection processing (Step S1208). When the original size is not determined (Step S1208: No), the CPU 401 shifts to the processing of Step S1205. When the original size is determined (Step S1208: Yes), the CPU 401 determines the sheet size based on the original size (Step S1209).

The CPU 401 determines whether or not the instruction of the start of reading is issued (Step S1210). When the CPU 401 determines that the instruction of the start of reading is issued (Step S1210: Yes), the CPU 401 sets a reading region corresponding to the original size to perform reading processing of reading the image information of the original (Step S1211).

In the processing of Step S1207, one line or a plurality of lines between the original size detection position Y1 and the original reading start position Y2 are read. In contrast, in the processing of Step S1211, the entire original size region determined in the processing of Step S1207 is read. The image information read by the reading processing is transmitted from the image processor 408 to the image forming unit 411.

The CPU 401 executes printing processing of copying the image information of the original, which is read in the processing of Step S1211, onto a sheet (Step S1212). As described above, the image forming processing is performed.

The above-described embodiments are given just for the purpose of describing the present invention more specifically, and the scope of the present invention is not limited by the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Embodiment(s) of the present invention can also be realized by a computer of a system or apparatus that includes one or more circuits (e.g., application specific integrated circuit (ASIC) or SOC (system on a chip)) for performing the functions of one or more of the above-described embodiment(s).

This application claims the benefit of Japanese Patent Application No. 2016-244057, filed Dec. 16, 2016 which is hereby incorporated by reference herein in its entirety.

What is claimed is:

1. An image reading apparatus, comprising:
an original table on which an original is to be placed;
an original presser configured to press the original placed on the original table;
a light source configured to irradiate the original with light;
a reader configured to read the original that is irradiated with light by the light source to output image information while moving the reading position in a first direction; and
a controller configured to determine a size of the original based on the image information output from the reader, wherein the controller is configured to:
  obtain image information output from the reader which is at a predetermined position in the first direction, by turning on the light source with the original presser being in a closed state;
  determine, based on a first difference among respective image information of pixels separated from a pixel of interest by a first distance in a second direction orthogonal to the first direction, based on N first differences of N pixels each surrounding the pixel of interest, and based on a second difference between a maximum image information and a minimum image information within a plurality of ranges to a pixel separated from the pixel of interest by a second distance that is larger than the first distance in the second direction, whether the pixel of interest is an edge pixel at an original end portion; and determine the size of the original based on a result of the determination.

2. The image reading apparatus according to claim 1, wherein the controller is configured to determine whether the pixel of interest is the edge pixel at the original end portion based on a result of comparison between the first difference and a first threshold value and on a result of comparison between the second difference and a second threshold value.

3. The image reading apparatus according to claim 1, wherein the controller is configured to determine whether the pixel of interest is the edge pixel at the original end portion based on the first difference, the second difference, and an average of image information of pixels present within a range to a pixel separated from the pixel of interest by a third distance.

4. The image reading apparatus according to claim 1, wherein the controller is configured to determine whether the pixel of interest is the edge pixel at the original end portion based on:
a result of comparison between the first difference and a first threshold value;
a result of comparison between the second difference and a second threshold value; and
a result of comparison between a third threshold value and an average of image information of pixels present within a range to a pixel separated from the pixel of interest by a third distance.

5. The image reading apparatus according to claim 1, wherein the image information of the pixel includes luminance information representing a luminance of the pixel.

6. The image reading apparatus according to claim 1, wherein the controller is configured to determine whether the pixel of interest is the edge pixel a plurality of times in a direction perpendicular to a direction in which the original end portion is detected.

7. The image reading apparatus according to claim 1, wherein the controller is configured to determine whether the pixel of interest is the edge pixel at a plurality of positions separated by a predetermined distance in a direction perpendicular to a direction in which the original end portion is detected.

8. The image reading apparatus according to claim 1, wherein the pixel of interest includes a pixel located on an outermost side in a predetermined detection range in the image information output from the reader.

9. The image reading apparatus according to claim 1, wherein the original presser has a surface for pressing the original, and the surface has a white color.

10. A reading method for an image reading apparatus, the image reading apparatus including:
an original table on which an original is to be placed;
an original presser configured to press the original placed on the original table and
a reader configured to read the original that is irradiated with light to output image information while moving the reading position in a first direction,
the reading method comprising:
obtaining image information output from the reader which is at a predetermined position in the first direction, by irradiating the original with light with the original presser being in a closed state;

determining, based on a first difference among respective image information of pixels separated from a pixel of interest by a first distance in a second direction orthogonal to the first direction, based on N differences of N pixels each surrounding the pixel of interest, and based on a second difference between a maximum image information and a minimum image information within a plurality of ranges to a pixel separated from the pixel of interest by a second distance that is larger than the first distance in the second direction, whether the pixel of interest is an edge pixel at an original end portion; and determining the size of the original based on a result of the determining.

11. An image forming apparatus, comprising an image forming unit configured to form an image on a predetermined recording medium based on reading data read by an image reading apparatus, wherein:
the image reading apparatus comprising:
an original table on which an original is to be placed;
an original presser configured to press the original placed on the original table;
a light source configured to irradiate the original with light;
a reader configured to read the original that is irradiated with light by the light source to output image information while moving the reading position in a firs direction; and
a controller configured to determine a size of the original based on the image information output from the reader,
wherein the controller is configured to:
obtain image information output from the reader which is at a predetermined position in the first direction, by turning on the light source with the original presser being in a closed state;
determine, based on a first difference among respective image information of pixels separated from a pixel of interest by a first distance in a second direction orthogonal to the first direction, based on N first differences of N pixels each surrounding the pixel of interest, and based on a second difference between a maximum image imformation and a minimum image information within a plurality of ranges to a pixel separated from the pixel of interest by a second distance that is larger than the first distance in the second direction, whether the pixel of interest is an edge pixel at an original end portion; and
determine the size of the original based on a result of the determination.

12. An image forming system, comprising:
an image reading apparatus; and
an image forming apparatus configured to form an image on a predetermined recording medium based on reading data read by the image reading apparatus, wherein:
the image reading apparatus comprising:
an original table on which an original is to be placed;
an original presser configured to press the original placed on the original table;
a light source configured to irradiate the original with light;
a reader configured to read the original that is irradiated with light by the light source to output image information while moving the reading position in a first direction; and a controller configured to determine a size of the original based on the image information output from the reader, wherein the controller is configured to:

obtain image information output from the reader which is at a predetermined position in the first direction, by turning on the light source with the original presser being in a closed state;

determine, based on a first difference among respective image information of pixels separated from a pixel of interest by a first distance in a second direction orthogonal to the first direction, based on N first differences of N pixels each surrounding the pixel of interest, and based on a second difference between a maximum image information and a minimum image information o within a plurality of ranges to a pixel separated from the pixel of interest by a second distance that is larger than the first distance in the second direction, whether the pixel of interest is an edge pixel at an original end portion; and determine the size of the original based on a result of the determination.

\* \* \* \* \*